US012664514B2

(12) United States Patent
Sun et al.

(10) Patent No.: US 12,664,514 B2
(45) Date of Patent: Jun. 23, 2026

(54) USER INTERFACE ENABLING ORDER FULFILLMENT OPTIONS BASED ON PREDICTED FULFILLMENT TIMES FROM A TRAINED MODEL

(71) Applicant: Maplebear Inc., San Francisco, CA (US)

(72) Inventors: Yueyi Sun, San Francisco, CA (US); Zi Wang, Mountain View, CA (US); Houtao Deng, Sunnyvale, CA (US); Aman Jain, Seattle, WA (US); Jian Wang, Saratoga, CA (US)

(73) Assignee: Maplebear Inc., San Francisco, CA (US)

( * ) Notice: Subject to any disclaimer, the term of this patent is extended or adjusted under 35 U.S.C. 154(b) by 195 days.

(21) Appl. No.: 18/616,724

(22) Filed: Mar. 26, 2024

(65) Prior Publication Data

US 2024/0330852 A1 Oct. 3, 2024

Related U.S. Application Data

(60) Provisional application No. 63/456,406, filed on Mar. 31, 2023.

(51) Int. Cl.
*G06Q 10/087* (2023.01)
*G06Q 10/04* (2023.01)
*G06Q 10/083* (2023.01)

(52) U.S. Cl.
CPC ........... *G06Q 10/087* (2013.01); *G06Q 10/04* (2013.01); *G06Q 10/083* (2013.01)

(58) Field of Classification Search
CPC ..... G06Q 10/087; G06Q 10/04; G06Q 10/083
See application file for complete search history.

(56) References Cited

U.S. PATENT DOCUMENTS

| | | | |
|---|---|---|---|
| 2020/0394697 A1* | 12/2020 | Paolella | G06Q 30/0623 |
| 2022/0351167 A1* | 11/2022 | Jagolta | G06N 3/08 |
| 2023/0049669 A1* | 2/2023 | Yuan | G06Q 30/0201 |
| 2023/0105829 A1* | 4/2023 | Reda | G06F 18/214 |
| | | | 705/26.2 |
| 2023/0394551 A1* | 12/2023 | Tate | G06Q 30/0625 |

* cited by examiner

*Primary Examiner* — Garcia Ade
(74) *Attorney, Agent, or Firm* — Fenwick & West LLP

(57) ABSTRACT

An online concierge system receives an order from a user including items to obtain from a retailer for delivery to a location. A picker selects the order and obtains items from the retailer. The user selects a time interval during which items from the order are delivered to the location. To prevent the user from selecting a time interval for fulfillment the online concierge system prevents the user from selecting a time interval when a picker may be unable to obtain the items from the retailer before a closing time of the retailer. The online concierge system evaluates time intervals by subtracting a travel time for the picker travelling from the retailer to the location from a predicted fulfillment time for the order. This prevents the time for delivering items after being obtained from affecting whether a time interval may be selected.

20 Claims, 5 Drawing Sheets

1

USER INTERFACE ENABLING ORDER FULFILLMENT OPTIONS BASED ON PREDICTED FULFILLMENT TIMES FROM A TRAINED MODEL

CROSS REFERENCE TO RELATED APPLICATION

This application claims the benefit of U.S. Provisional Application No. 63/456,406, filed Mar. 31, 2023, which is incorporated by reference in its entirety.

BACKGROUND

Online concierge systems receive orders from users. An order identifies one or more items to be obtained by a picker and a retailer from which the picker obtains the items. The online concierge system allocates an order from a user to a picker who fulfills the order by obtaining the items in the order from the retailer in the order and delivers the items to a location specified by the order. An order additionally includes a time interval for the order to be fulfilled. The time interval specifies a range of times when a user expects to receive the items in the order at the location in the order.

Many online concierge systems maintain discrete time intervals for fulfillment of orders, and receive a selection of a discrete time interval for fulfilling an order from a user. For example, an online concierge system maintains multiple time intervals that each correspond to different ranges of times of day from which a user selects a time interval for an order. Additionally, many online concierge systems identify one or more time intervals that are measured relative to a time when the online concierge system receives an order. For example, a time interval is within an hour, or within another amount of time, from a time when the online concierge system receives the order.

When users create orders, an online concierge system accounts for the operating hours of a retailer from which the order is to be fulfilled. To account for operating hours of a retailer, an online concierge system estimates an amount of time to fulfill the order and uses the estimated amount of time to fulfill the order to determine an estimated time of arrival of items from the order to a location included in the order for different time intervals. Conventional online concierge systems prevent the user from selecting one or more time intervals where the estimated time of arrival of items in the order to the location in the order is later than the closing time of the retailer in the order. This prevents a user from selecting a time interval for fulfilling an order when the user is unlikely to receive the items in the order before the closing time of the retailer.

However, a portion of the time for fulfilling an order occurs outside of the retailer when the picker delivers obtained items to the user. Conventional methods for estimating the amount of time to fulfill an order do not differentiate between portions of order fulfillment including inside a retailer and outside of the retailer. This lack of differentiation between order fulfillment time inside a retailer and outside of retailer reduces a number of orders the online concierge system may fulfill in a day by preventing users from selecting time intervals where a picker obtains items from a retailer before the closing time of the retailer but does not reach the location in the order with the obtained items until after the closing time of the retailer.

SUMMARY

In accordance with one or more aspects of the disclosure, an online concierge system receives characteristics of an order from a user. The characteristics of the order include a retailer, one or more items to be obtained from the retailer, and a location where the items are to be delivered. In various embodiments, the user provides the characteristics of the order to an ordering interface generated by an application associated with the online concierge system executing on a user client device of the user. The user client device transmits the received characteristics of the order to the online concierge system.

While the characteristics of the order provide information about the order, to complete creation of the order, the online concierge system identifies one or more time intervals for fulfilling the order to the user. The user selects a time interval to identify a range of times when the user expects to receive the items included in the order to complete creation of the order. In some embodiments, the online concierge system identifies multiple discrete time intervals, each corresponding to different ranges of times, to the user via an ordering interface. One or more time intervals are measured relative to the time when the online concierge system receives the order in some embodiments. For example, a time interval is a priority time interval for fulfilling the order based on a time when the order is received.

However, the retailer included in the characteristics of the order has hours of operation, outside of which pickers are unable to obtain items from the retailer. The hours of operation for the retailer comprise an opening time and a closing time, with the opening time specifying an earliest time pickers are capable of obtaining items from the retailer and the closing time specifying a latest time pickers are capable of obtaining items from the retailer. The online concierge system may retrieve the hours of operation of the retailer from stored information describing the retailer.

When the characteristics of the order are received within a threshold amount of time from the closing time of the retailer, there may be insufficient time for a picker fulfilling the order to obtain items from the retailer before the closing time of the retailer during certain time intervals for fulfilling the order. This inability to obtain items before the retailer's closing time prevents the picker from fulfilling the order, which may deter the user from creating additional orders through the online concierge system. In various embodiments, the online concierge system decrease a likelihood of a picker being unable to obtain the items before the retailer's closing time, the online concierge system prevents the user from selecting one or more time intervals for fulfilling the order when a picker is unlikely to obtain the items before the closing time of the retailer.

To prevent the user from selecting a time interval for fulfilling the order when the picker would be unlikely to obtain the items from the order before the closing time of the retailer, the online concierge system applies a fulfillment time model to the characteristics of the order. In various embodiments, the fulfillment time model is trained based on fulfillment training examples based on prior orders through backpropagation in an iterative training process. The fulfillment time model generates a predicted fulfillment time for the order from the characteristics of the order. The predicted fulfillment time indicates an amount of time from the picker selecting the order for fulfillment to the picker delivering items from the retailer to the location in the characteristics of the order.

While the online concierge system may use the predicted fulfillment time along with an order identification time when the order is identified to pickers to determine whether a picker is capable of fulfilling the order before the closing time of the retailer, the predicted fulfillment time includes time when the picker is delivering items obtained from the retailer to the location. After a picker has obtained the items from the retailer, the closing time of the retailer does not prevent the picker from fulfilling an order. So, using the predicted fulfillment time to determine whether a picker is capable of fulfilling the order during one or more time intervals may cause identification of certain time intervals as time intervals where a picker is unable to fulfill the order, even though the picker may obtain items from the retailer before its closing time but deliver the obtained items to the location in the order after the closing time of the retailer. Although identifying time intervals when the order is unlikely to be fulfilled before the closing time of the retailer using the predicted fulfillment time decreases a likelihood of the user selecting a time interval when the picker may be unable to obtain items before the closing time of the retailer, preventing the user from selecting certain time intervals because of the predicted fulfillment time may overly limit potential time intervals for fulfilling the order available to the user.

To account for effects of time after the picker has left the retailer to deliver the items on the predicted fulfillment time, the online concierge system applies a travel time model to the characteristics of the order. In various embodiments, the travel time model is trained based on travel time training examples including characteristics of prior orders with corresponding labels specifying an amount of time from a picker obtaining items at a retailer to the picker indicating the items were delivered to the location. The online concierge system iteratively trains the travel time model through backpropagation in various embodiments. Application of the travel time model to the characteristics of the order generates a predicted travel time of a picker when fulfilling the order. The predicted travel time indicates an amount of time for the picker to travel from the retailer to the location identified by the characteristics of the order.

The online concierge system subtracts the predicted travel time from the predicted fulfillment time to determine a predicted amount of time to complete obtaining items from the retailer. In some embodiments, the online concierge system adds a buffer time interval to the predicted travel time to generate a modified predicted travel time and determines the predicted amount of time to complete obtaining items from the retailer by subtracting the modified predicted travel time from the predicted fulfillment time. Increasing the predicted travel time by the buffer time interval allows the online concierge system to account for potential errors in the predicted travel time or potential variations in the closing time of the retailer. Hence, a predicted amount of time to complete obtaining items from the retailer is an amount of time spent by a picker fulfilling the order before the picker travels from the retailer to the location identified by the order.

For an order identification time, which is a time when the order is identified to one or more pickers for selection, the online concierge system generates an acquisition time by adding the predicted amount of time to complete obtaining items from the retailer to the order identification time. The online concierge system may correlate different order identification times with different time intervals for fulfilling the order. In various embodiments, the order identification time is within a threshold amount of time of the closing time of the retailer, allowing the online concierge system to limit determination of the acquisition time to order identification times within the threshold amount of time of the closing time of the retailer. As the predicted amount of time to complete obtaining items from the retailer excludes the travel time from the retailer to the location, the acquisition time is a time when the retailer has completed obtaining items from the retailer.

The online concierge system determines whether the acquisition time is later than the closing time of the retailer. In response to determining the acquisition time is later than the closing time of the retailer, the online concierge system disables an option in an ordering interface for the user to select a time interval corresponding to the order identification time, as the picker would be unable to obtain the items for the order before the closing time of the retailer. In some embodiments, the online concierge system disables the option for selecting the time interval by preventing display of the time interval corresponding to the order identification time via the ordering interface. Disabling the option for selecting the time interval corresponding to the order identification time from an ordering interface prevents the user from selecting the time interval corresponding to the order identification time when the picker is unlikely to obtain the items for the order before the closing time of the retailer.

In some embodiments, in response to determining the acquisition time is earlier than the closing time of the retailer, the online concierge system enables the option in the ordering interface for the user to select the time interval corresponding to the order identification time, as the picker would be able to obtain the items for the order before the closing time of the retailer. However, in alternative embodiments, in response to determining the acquisition time is before the closing time of the retailer, the online concierge system determines whether a probability of fulfillment of the order the same day it is received by the online concierge system satisfies one or more criteria. In various embodiments, the online concierge system applies a same day fulfillment model to characteristics of the order to determine the probability of fulfilling the order during the day when the order is received. In some embodiments, the same day fulfillment model generates a probability of the order being able to be fulfilled during the day when the order is received by the online concierge system. Alternatively, the same day fulfillment model generates a probability of the order being unable to be fulfilled during the day when the order is received by the online concierge system. The online concierge system trains the same day fulfillment model based on same day fulfillment training examples each including characteristics of a previously received order and a corresponding label indicating whether the previously received order was fulfilled on a day when the online concierge system received the previously received order. Iterative application of the same day fulfillment model to same day fulfillment training examples and backpropagation may be used to train the same day fulfillment model in various embodiments.

In embodiments where the same day fulfillment model generates a probability of the order being fulfilled on a day the order was received by the online concierge system, the online concierge system determines whether the probability of the order being fulfilled on the day the order was received by the online concierge system is greater than a threshold probability. In response to determining the probability of the order being fulfilled on the day the order was received by the online concierge system is greater than a threshold probability, the online concierge system enables the option in the ordering interface for the user to select the time interval corresponding to the order identification time, as the picker is likely to fulfill the order on the day the online concierge system received the order. However, in response to determining the probability of the order being fulfilled on the day the order was received by the online concierge system is less than the threshold probability, the online concierge system disables the option in the ordering interface for selection of the time interval corresponding to the order identification time.

Alternatively, when the same day fulfillment model generates a probability of the order being unable to be fulfilled on a day the order was received by the online concierge system, the online concierge system determines whether the probability of the order being unable to be fulfilled on the day the order was received by the online concierge system is less than an additional threshold probability. In response to determining the probability of the order being unable to be fulfilled on the day the order was received is less than the additional threshold probability, the online concierge system enables the option in the ordering interface for the user to select the time interval corresponding to the order identification time, as the picker is likely to fulfill the order on the day the online concierge system receives the order. However, in response to determining the probability of the order being unable to be fulfilled on the day the order was received by the online concierge system is greater than the additional threshold probability, the online concierge system disables the option in the ordering interface for selection of the time interval corresponding to the order identification time.

In one or more other embodiments, the online concierge system initially applies the same day fulfillment model to received characteristics of the order, generating the probability of fulfilling the order during the day when the order is received based on the characteristics of the order. The online concierge system determines whether the probability of fulfilling the order during the day when the order is received by the online concierge system satisfies one or more criteria. In response to the probability of fulfilling the order during the day when the online concierge system received the order satisfying the one or more criteria, the online concierge system generates the predicted travel time and the predicted fulfillment time, as further described above. In one or more embodiments where the same day fulfillment model generates a probability of the order being able to be fulfilled on a day the order was received by the online concierge system, the online concierge system generates the predicted travel time and the predicted fulfillment time in response to the probability of the order being able to be fulfilled on the day the order was received by the online concierge system being less than a threshold value. Similarly, in one or more embodiments where the same day fulfillment model generates a probability of the order being unable to be fulfilled on a day the order was received by the online concierge system, the online concierge system generates the predicted fulfillment time and the predicted travel time in response to the probability of the order being unable to be fulfilled on the day the order was received by the online concierge system being less than the threshold value.

Subsequently, the online concierge system determines the predicted amount of time to complete obtaining items from the retailer and generates an acquisition time for an order identification time by adding the predicted amount of time to complete obtaining items from the retailer to the order identification time. The online concierge system determines whether the acquisition time is later than the closing time of the retailer to determine whether to enable to customer to select a time interval corresponding to the order identification time, as further described above. In response to the probability of fulfilling the order during the day when the order not satisfying the one or more criteria, the online concierge system determines whether to enable selection of a time interval using the predicted fulfillment time and the order identification time of the time interval, so the determination of the time interval includes the travel time from the retailer to the location in the order. Hence, in some embodiments, the online concierge system conditions evaluation of whether to enable the customer to select a time interval using the predicted amount of time to complete obtaining items from the retailer to the order identification time, without including travel time from the retailer to the retailer, on the probability of the probability of fulfilling the order during the day when the order satisfies one or more criteria.

The probability of order fulfillment on the day when the order was received by the online concierge system and the predicted travel time are determined from the characteristics of the order, providing the online concierge system with order-specific information for evaluating a likelihood of a picker obtaining items for the order from the retailer before the closing time of the retailer. Such order-specific evaluations of time intervals for fulfilling different orders provides a wider range of potential time intervals for order fulfillment for presentation to the user, while mitigating a likelihood of a user selecting a time interval during which a picker is unlikely to obtain items for an order before the closing time of a retailer, in contrast to rule-based comparisons of predicted times when orders are fulfilled to the closing time of the retailer. Similarly, using the predicted amount of time to complete obtaining items from the retailer rather than predicted fulfillment time when determining whether to enable selection of a time interval by the user more accurately accounts for potential effects of the closing time of the retailer on fulfillment of the order, providing a wider range of potential time intervals for fulfilling the order.

DETAILED DESCRIPTION

Figure 1:
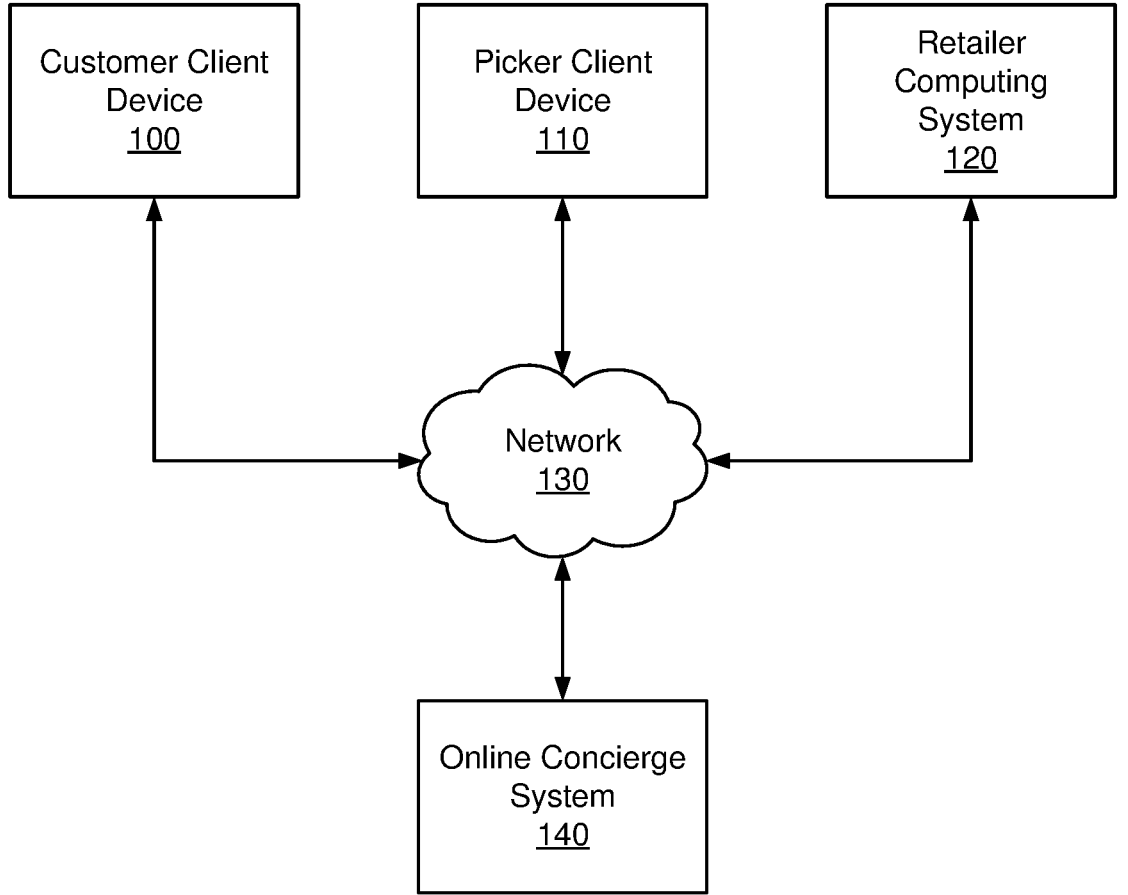
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, users, pickers, and retailers may be generically referred to as "users" of the online concierge system 140. Additionally, while one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, means a good or product that can be provided to the user through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user such that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from a user client device 100 through the network 130. The online concierge system 140 selects a picker to service the user's order and transmits the order to a picker client device 110 associated with the picker. The picker collects the ordered items from a retailer location and delivers the ordered items to the user. The online concierge system 140 may charge a user for the order and provides portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140. The online concierge system 140 is described in further detail below with regards to FIG. 2.

Figure 2:
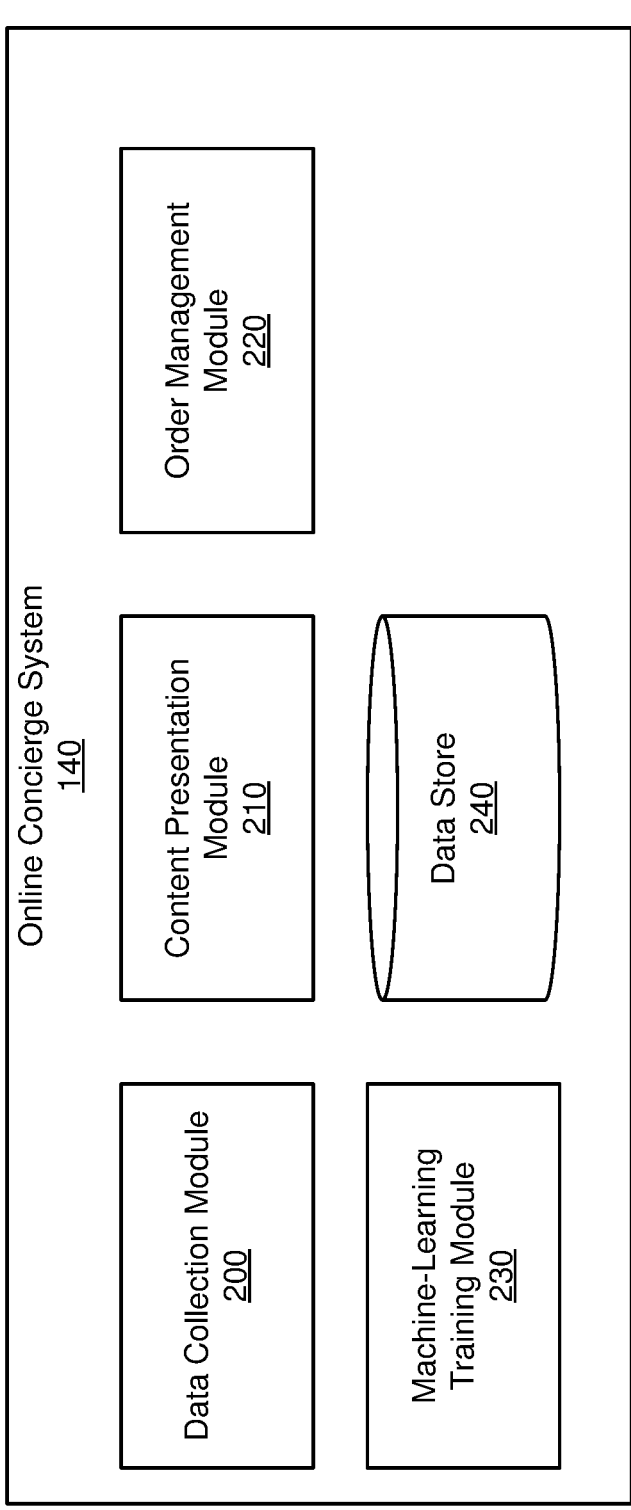
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe character-istics of a user. User data may include a user's name, address, shopping preferences, favorite items, or stored payment instruments. The user data also may include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automati-cally by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a user rating for the picker, which retailers the picker has collected items at, or the picker's previous shopping history. Additionally, the picker data may include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a user associated with the order, a retailer location from which the user wants the ordered items collected, or a timeframe within which the user wants the order delivered. Order data may further include information describing how the order was serviced, such as which picker serviced the order, when the order was delivered, or a rating that the user gave the delivery of the order.

The content presentation module 210 selects content for presentation to a user. For example, the content presentation module 210 selects which items to present to a user while the user is placing an order. The content presentation module 210 generates and transmits the ordering interface for the user to order items to a user client device 100. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The user provides characteristics of an order to the online concierge system 140 via the ordering interface. Character-istics of an order specify information for fulfilling the order. Example characteristics of an order include items to be obtained, a retailer from which the items are to be obtained, and a location where the items are to be delivered. Other characteristics, such as payment information for the order, may also be received via an ordering interface. In various embodiments, after receiving at least a set of the order characteristics, the content presentation module 210 gener-ates an additional ordering interface, or an additional portion of the ordering interface, identifying one or more time intervals for fulfilling the order. The user selects a time interval to identify a range of times when the user expects to receive the items included in the order to complete creation of the order. Each time interval corresponds to different ranges of times for fulfilling the order. In various embodi-ments, one or more time intervals are measured relative to the time when the online concierge system receives the order in some embodiments.

However, hours of operation of the retailer included in the characteristics of the order limit times when a picker is capable of obtaining items from the retailer. The hours of operation of a retailer comprise an opening time and a closing time. A picker is unable to obtain items before the opening time or after the closing time. The online concierge system may retrieve the hours of operation of the retailer from stored information describing the retailer in the data store 240.

To prevent the user from selecting a time interval for fulfilling the order when a picker has at least a threshold probability of being unable to obtain the items from the retailer before the closing time of the retailer, the content presentation module 210 disables selection of one or more time intervals by the user via the interface. As further described below in conjunction with FIGS. 3-5, the content presentation module 210 generates a predicted fulfillment time for the order based on the received characteristics of the order, and generates a predicted travel time comprising an amount of time for the picker to travel from the retailer to the location identified by the characteristics of the order. Based on a difference between the predicted fulfillment time for the order and the predicted travel time for the order, as well as identification times corresponding to different time intervals, the content prediction model 210 determines whether to disable or enable selection of various time intervals through an ordering interface.

As further described below in conjunction with FIGS. 3-5, the content presentation module 210 determines whether adding an order identification time for a time interval and the difference between the predicted fulfillment time for the order and the predicted travel time for the order is later than the closing time for the retailer for the order. In response to the sum of the order identification time for a time interval and the difference between the predicted fulfillment time for the order and the predicted travel time for the order being later than the closing time for the retailer for the order, the content presentation module 210 disables selection of the time interval. In some embodiments, the online concierge system 140 also determines whether a probability of fulfilling the order during the day when the order is received satisfies one or more criteria, conditioning enabling selection of the time interval on the probability satisfying the one or more criteria, as further described below in conjunction with FIGS. 3 and 5.

The content presentation module 210 may use an item selection model to score items for presentation to a user. An item selection model is a machine learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine learning models and may be stored in the data store 240.

In some embodiments, the content presentation module 210 scores items based on a search query received from the user client device 100. A search query is text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of their order. In some embodiments, the order management module 220 computes an estimated time of arrival for the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include user data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

In various embodiments, the machine learning training module 230 trains a fulfillment time model to generate a predicted fulfillment time for an order based on characteristics of the order. The fulfillment time model receives characteristics of an order as input and generates the predicted fulfillment time for the order from the received characteristics. The predicted fulfillment time is an amount of time from when an order is identified to one or more pickers for selection to when a picker delivers items in the order to a location included in the order. In various embodiments, the machine learning training module 230 applies an iterative process that trains the fulfillment time model through application to each of a set of fulfillment training examples. To train the fulfillment time model based on a fulfillment training example, the machine learning training module 230 applies the fulfillment time model to order characteristics in the fulfillment training example to generate a predicted fulfillment time for the fulfillment training example. The machine learning training module 230 scores the predicted fulfillment time for the fulfillment training example based on a loss function. A loss function is a function that generates a score for the predicted fulfillment time for a fulfillment training example such that the score is higher when the fulfillment time model performs poorly and lower when the fulfillment time model performs well. In cases where the fulfillment training example includes a label, the loss function is also based on the label for the fulfillment training example. Some example loss functions include the mean square error function, the mean absolute error, hinge loss function, and the cross-entropy loss function. The machine learning training module 230 updates the set of parameters for the fulfillment time model based on the score generated by the loss function. For example, the machine learning training module 230 may apply gradient descent to update the set of parameters comprising the fulfillment time model. Training of the fulfillment time model is further described below in conjunction with FIG. 3.

The machine learning training module 230 also trains a travel time model to generate a predicted travel time for an order based on characteristics of the order. The travel time for the order specifies an amount of time for a picker to travel from a retailer included in an order to a location included in the order, so the predicted travel time identifies an amount of time spent by a picker delivering obtained items for an order to the location included in the order. The travel time model receives characteristics of an order as input and generates the predicted travel time for the order from the received characteristics. In various embodiments, the machine learning training module 230 applies an iterative process that trains the travel time model through application to each of a set of travel time training examples. To train the travel time model based on a travel time training example, the machine learning training module 230 applies the travel time model to order characteristics in the travel time training example to generate a predicted travel time for the travel time training example. The machine learning training module 230 scores the predicted travel time for the travel time training example based on a loss function. A loss function is a function that generates a score for the predicted travel time for a travel time training example such that the score is higher when the travel time model performs poorly and lower when the travel time model performs well. In cases where the travel time training example includes a label, the loss function is also based on the label for the travel time training example. Some example loss functions include the mean square error function, the mean absolute error, hinge loss function, and the cross-entropy loss function. The machine learning training module 230 updates the set of parameters for the travel time model based on the score generated by the loss function. For example, the machine learning training module 230 may apply gradient descent to update the set of parameters comprising the travel time model. Training of the travel time model is further described below in conjunction with FIG. 3.

In various embodiments, the machine learning training module 230 trains a same day fulfillment model to generate a probability of fulfilling an order on a day the online concierge system 140 received the order based on characteristics of the order. The generated probability may be a probability of the order being able to be fulfilled the day the online concierge system 140 received the order or may be a probability of the order being unable to be fulfilled the day the online concierge system 140 received the order in various embodiments. In various embodiments, the machine learning training module 230 applies an iterative process that trains the same day fulfillment model through application to each of a set of same day fulfillment training examples. To train the same day fulfillment model based on a same day fulfillment training example, the machine learning training module 230 applies the same day fulfillment model to order characteristics in the same day fulfillment training example to generate a probability of fulfilling an order in the same day fulfillment training example on the day the online concierge system 140 received the order. The machine learning training module 230 scores the probability of fulfilling an order in the same day fulfillment example on the day the online concierge system 140 received the order in the same day fulfillment example based on a loss function. A loss function is a function that generates a score for the probability of fulfilling an order in the same day fulfillment example on the day the online concierge system 140 received the order in the same day fulfillment example for a same day fulfillment training example such that the score is higher when the same day fulfillment model performs poorly and lower when the same day fulfillment model performs well. In cases where the same day fulfillment training example includes a label, the loss function is also based on the label for the same day fulfillment training example. Some example loss functions include the mean square error function, the mean absolute error, hinge loss function, and the cross-entropy loss function. The machine learning training module 230 updates the set of parameters for the same day fulfillment model based on the score generated by the loss function. For example, the machine learning training module 230 may apply gradient descent to update the set of parameters comprising the same day fulfillment model. Training of the same day fulfillment model is further described below in conjunction with FIG. 3.

The data store 240 stores data used by the online concierge system 140. For example, the data store 240 stores user data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
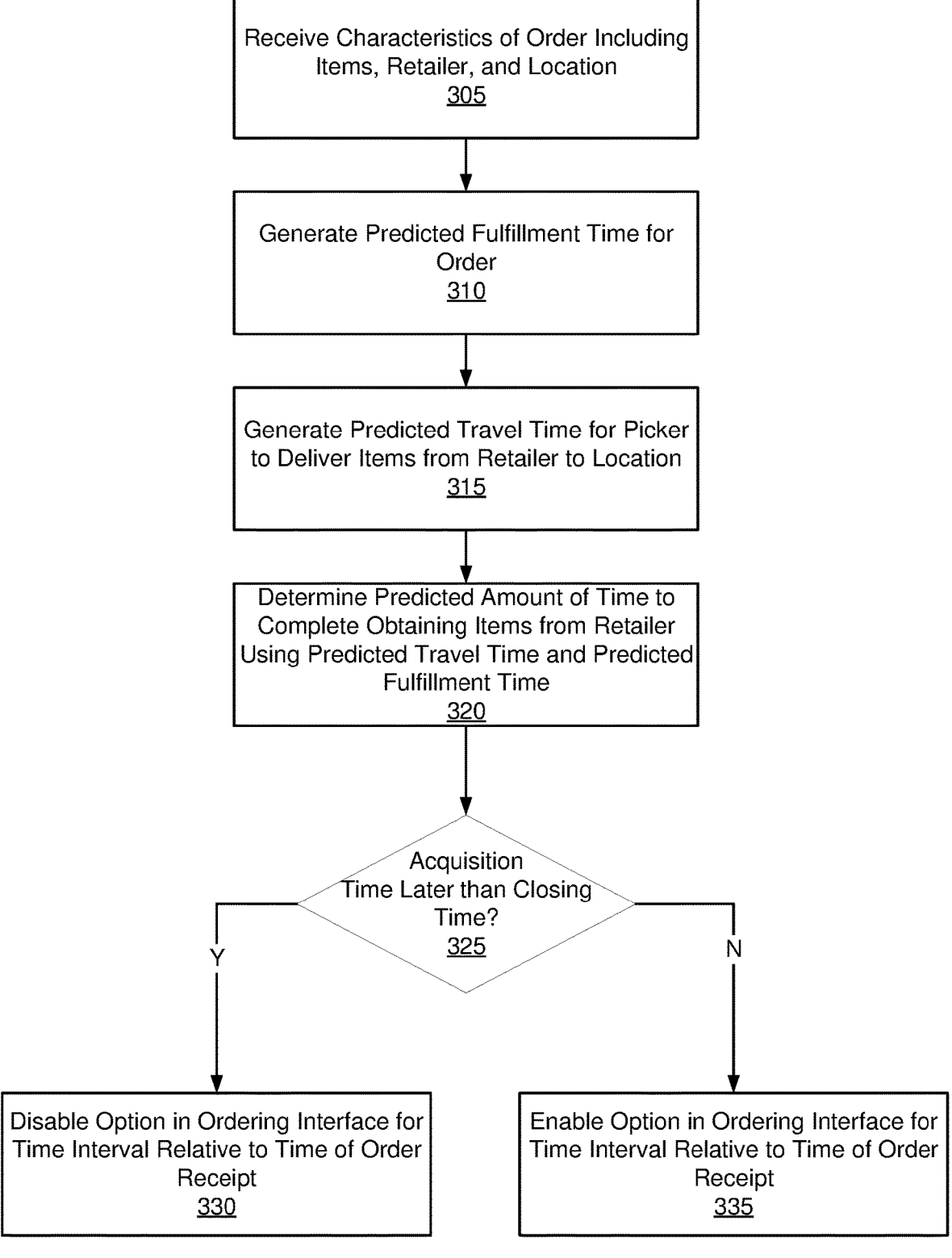
FIG. 3 illustrates a flowchart of a method for determining whether an order received by an online concierge system is capable of being fulfilled on a day when the order is received a predicted travel time from a retailer for a picker fulfilling the order, in accordance with one or more embodiments.

FIG. 3 is a flowchart of a method for determining whether an order received by an online concierge system 140 is capable of being fulfilled on a day when the order is received using a predicted travel time from a retailer for a picker fulfilling the order, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The online concierge system 140 receives 305 characteristics of an order from a user. The received characteristics include one or more items, a retailer from which the items are to be obtained, and a location where the one or more items are to be delivered. One or more additional characteristics may additionally be received 305 in various embodiments. For example, one or more characteristics also specify payment information from the user to the online concierge system 140 for the order.

In various embodiments, the online concierge system 140 receives 305 the characteristics of the order from a user client device 100. For example, an ordering interface presented by the user client device 100 receives a selection of the retailer, selections of one or more items, a location where the items are to be delivered, and other characteristics of the order. The user client device 100 transmits the selection of the retailer, selections of one or more items, the location, and other characteristics of the order to the online concierge system 140.

After receiving 305 the characteristics of the order, the online concierge system 140 prompts the user to select a time interval for delivery of items in the order to the location included in the characteristics. In various embodiments, the online concierge system 140 transmits instructions identifying different discrete time intervals for fulfillment of the order to the user client device 100 for presentation in an ordering interface and receives a selection of a time interval from the user to select the time interval for delivery of the order. One or more of the time intervals are measured relative to a time when the online concierge system 140 receives the order in various embodiments, allowing the user to request fulfillment of the order soon after being received from the user. Different discrete time intervals correspond to different time ranges within a day when the online concierge system 140 receives the order, providing the user with options for when to receive the items included in the order.

As a picker obtains items in the order from a retailer, hours of operation of the retailer in the order affect the ability of the picker to fulfill the order. The hours of operation of a retailer include an opening time for the retailer and a closing time for the retailer. A picker is not capable of obtaining items from the retailer before the opening time or after the closing time. Hence, the picker is limited to obtaining items from the retailer during times between the opening time and the closing time of the retailer. In various embodiments, the online concierge system 140 stores hours of operation in association with various retailers. When the characteristics of the order are received 305 within a threshold amount of time from the closing time of the retailer, there may be insufficient time for a picker fulfilling the order to obtain items from the retailer before the closing time of the retailer. This prevents the picker from fulfilling the order, which may deter the user from creating additional orders through the online concierge system 140.

To prevent the user from selecting a time interval for fulfilling the order when the picker would be unable to obtain the items from the order before the closing time of the retailer identified by the order during the time interval, the online concierge system 140 generates 310 a predicted fulfillment time for the order. The predicted fulfillment time is an amount of time from a picker selecting the order to fulfill to the user receiving the items included in the order from the picker.

The online concierge system 140 generates 310 the predicted fulfillment time for the picker to fulfill the order based on characteristics of the order. In various embodiments, the online concierge system 140 applies a trained fulfillment time model to the characteristics of the order, with the trained fulfillment time model generating a predicted fulfillment time from the picker selecting the order to the picker delivering items from the order to the location in the order based on characteristics of the order. Example characteristics of the order to which the trained fulfillment time model is applied include: a number of items in the order, items in the order, item categories of items in the order, the location included in the order, and the retailer included in the order. However, different or additional characteristics of the order may be received by the fulfillment time model as input in various embodiments.

In various embodiments, the online concierge system 140 trains the fulfillment time model to receive characteristics of the order and to generate a predicted fulfillment time from a picker selecting the order to the user receiving the items included in the order at the location included in the order. The online concierge system 140 generates a fulfillment time training dataset from previously fulfilled orders. The fulfillment time training dataset includes multiple fulfillment time training examples. Each fulfillment time training example includes characteristics of a previously fulfilled order, with a label applied to the fulfillment time training example specifying an amount of time from a picker selecting the prior order to the online concierge system 140 receiving an indication the items in the prior order were delivered to the location included in the prior order.

The fulfillment time model comprises a set of weights stored on a non-transitory computer readable storage medium in various embodiments. For training, the online concierge system 140 initializes a network of a plurality of layers comprising the fulfillment time model, with each layer including one or more weights. The fulfillment time model receives as input a set of characteristics of an order and outputs a predicted fulfillment time from a picker selecting the order to the items in the order arriving at the location included in the order.

After initializing the set of weights comprising the fulfillment time model, the online concierge system 140 trains the fulfillment time model by applying the fulfillment time model to multiple fulfillment time training examples of the fulfillment time training dataset to generate the parameters (e.g., the weights) for the fulfillment time model. As further described above, in various embodiments, a fulfillment time training example includes a combination of characteristics of a prior order, with a label applied to the fulfillment time training example indicating amount of time from a picker selecting the prior order fulfillment to the items in the prior order being received at the location identified in the prior order. Applying the fulfillment time model to a fulfillment time training example generates a predicted fulfillment time from the picker selecting the prior order in the fulfillment time training example to items in the prior order being delivered to the location included in the prior order of the fulfillment time training example.

For each fulfillment time training example to which the availability model is applied, the online concierge system 140 generates a score comprising an error term based on the predicted fulfillment time from selection of a prior order included in a fulfillment time training example to delivery of items in the prior order to the location in the prior order included in the fulfillment time training example and the label applied to the fulfillment time training example. The error term is larger when a difference between the predicted fulfillment time for the fulfillment time training example and the label applied to the fulfillment time training example is larger and is smaller when the difference between the predicted fulfillment time for the fulfillment time training example and the label applied to the fulfillment time training example is smaller. In various embodiments, the online concierge system 140 generates the error term using a loss function based on a difference between the predicted fulfillment time for a fulfillment time training example and the label applied to the fulfillment time training example. Example loss functions include a mean square error function, a mean absolute error, a hinge loss function, and a cross-entropy loss function.

The online concierge system 140 backpropagates the error term to update the set of parameters comprising the fulfillment time model and stops backpropagation in response to the error term, or in response to the loss function, satisfying one or more criteria. For example, the online concierge system 140 backpropagates the error term through the fulfillment time model to update parameters of the fulfillment time model until the error term has less than a threshold value. For example, the online system 140 may apply gradient descent to update the set of parameters comprising the fulfillment time model. The online concierge system 140 stores the set of parameters comprising the trained fulfillment time model on a non-transitory computer readable storage medium after stopping the backpropagation.

The predicted fulfillment time of the order accounts for an amount of time for the picker to accept the order, an amount of time for the picker to travel to the retailer identified by the order, an amount of time for the picker to obtain items in the order from the retailer, and a travel time for the picker to deliver the obtained items to the location included in the order. Hence, the predicted fulfillment time accounts for an amount of time between the picker leaving the retailer to the picker arriving at the location in the order with the items in the order. As a picker may obtain items in the order before the closing time of the retailer, but not arrive at the location identified by the order until after the retailer's closing time, the predicted fulfillment time of the order may indicate fulfillment of an order after the closing time of the retailer, even though the picker may complete obtaining the items before the closing time of the retailer.

To more accurately evaluate whether a picker is capable of obtaining items included in the order before a closing time of the retailer to fulfill the order during one or more time intervals, the online concierge system 140 generates 315 the travel time for the picker to deliver the obtained items from the retailer to the location included in the order. In various embodiments, the online concierge system 140 applies a trained travel time model to the characteristics of the order, with the trained travel time model generating a predicted travel time from the retailer to the location included in the order based on characteristics of the order. Example characteristics of the order to which the trained travel time model is applied include: a number of items in the order, items in the order, item categories of items in the order, the location included in the order, and the retailer included in the order. However, different or additional characteristics of the order may be received by the travel time model as input in various embodiments.

In various embodiments, the online concierge system 140 trains the travel time model to receive characteristics of the order and to generate 315 a travel time for a picker to travel from a retailer included in the order to a location included in the order. The online concierge system 140 generates a travel time training dataset from previously fulfilled orders. The travel time training dataset includes multiple travel time training examples. Each travel time training example includes characteristics of a previously fulfilled order, with a label applied to a travel time training example specifying an amount of time from obtaining the items in the prior order to the items in the prior order being received at a location identified in the prior order. In some embodiments, the online concierge system 140 determines the amount of time from obtaining the items in the prior order to the items in the prior order being received at the location identified in the prior order based on times received from a picker who fulfilled the prior order. For example, the online concierge system 140 determines the amount of time from obtaining the items in the prior order to the items in the prior order being received at the location identified in the prior order as a difference between a time when the online concierge system 140 received an indication the picker fulfilling the prior order checked out from the retailer in the prior order and a time when the online concierge system 140 received an indication from the picker fulfilling the prior order that the items from the prior order were delivered to the location identified by the prior order.

The travel time model comprises a set of weights stored on a non-transitory computer readable storage medium in various embodiments. For training, the online concierge system 140 initializes a network of a plurality of layers comprising the travel time model, with each layer including one or more weights. The travel time model receives as input a set of characteristics of an order and outputs a predicted travel time from a retailer included in the order to a location included in the order.

After initializing the set of weights comprising the travel time model, the online concierge system 140 trains the travel time model by applying the travel time model to multiple travel time training examples of the travel time training dataset to generate the parameters (e.g., the weights) for the travel time model. As further described above, in various embodiments, a travel time training example includes a combination of characteristics of a prior order, with a label applied to the travel time training example specifying an amount of time from obtaining the items in the prior order to the items in the prior order being received at the location identified in the prior order. Applying the travel time model to a travel time training example generates a predicted travel time from the retailer included in the travel time training example to the location included in the travel time training example.

For each travel time training example to which the travel time model is applied, the online concierge system 140 generates a score comprising an error term based on the predicted travel time from the retailer included in the travel time training example to the location included in the travel time training example and the label applied to the travel time training example. The error term is larger when a difference between the predicted travel time from the retailer included in the travel time training example to the location included in the travel time training example and the label applied to the travel time training example is larger and is smaller when the difference between the predicted travel time from the retailer included in the travel time training example to the location included in the travel time training example and the label applied to the travel time training example is smaller. In various embodiments, the online concierge system 140 generates the error term using a loss function based on a difference between the predicted travel time from the retailer included in the travel time training example to the location included in the travel time training example and the label applied to the travel time training example. Example loss functions include a mean square error function, a mean absolute error, a hinge loss function, and a cross-entropy loss function.

The online concierge system 140 backpropagates the error term to update the set of parameters comprising the travel time model and stops backpropagation in response to the error term, or in response to the loss function, satisfying one or more criteria. For example, the online concierge system 140 backpropagates the error term through the travel time model to update parameters of the travel time model until the error term has less than a threshold value. For example, the online system 140 may apply gradient descent to update the set of parameters comprising the travel time model. The online concierge system 140 stores the set of parameters comprising the trained travel time model on a non-transitory computer readable storage medium after stopping the backpropagation.

Based on the predicted fulfillment time and the predicted travel time, the online concierge system 140 determines 320 a predicted amount of time to complete obtaining items in the order from the retailer. In various embodiments, the online concierge system 140 subtracts the predicted travel time from the predicted fulfillment time to determine 320 the predicted amount of time to complete obtaining items from the retailer. In some embodiments, the online concierge system 140 generates a modified predicted travel time by adding a buffer time interval to the predicted travel time and determines 320 the predicted amount of time to complete obtaining items from the retailer by subtracting the modified predicted travel time from the predicted fulfillment time. The online concierge system 140 may maintain different buffer time intervals for different retailers or for different locations included in the order. Alternatively or additionally, the buffer time interval is a predetermined time interval applicable to various characteristics of the order. Increasing the predicted travel time by the buffer time interval allows determination of the predicted amount of time to complete obtaining items in the order from the retailer to account for potential errors in the predicted travel time or potential variations in the closing time of the retailer.

For one or more order identification times subsequent to a time when the online concierge system 140 received 305 the characteristics for the order, the online concierge system 140 determines whether 325 an acquisition time based on an order identification time is later than the closing time of the retailer. An order identification time is a time when the order is identified to one or more pickers for selection, and an order identification time corresponds to a time interval for fulfilling the order. Hence, an acquisition time determined by the online concierge system 140 corresponds to a time interval for fulfilling the order. The online concierge system 140 determines the acquisition time by incrementing the order identification time by the predicted amount of time to complete obtaining items from the retailer. Hence, the acquisition time indicates a time when the picker completes obtaining items for the order from the retailer when the order is identified to the picker at the order identification time. This allows the online concierge system 140 to evaluate, for an order identification time, whether the picker would complete obtaining items in the order from the retailer before or after the closing time of the retailer. As the predicted amount of time to complete obtaining items from the retailer does not include the travel time from the retailer to the location in the order after the picker obtains the items included in the order, determining 325 whether the acquisition time is later than the closing time of the retailer indicates whether the picker would complete obtaining items from the retailer before the retailer's closing time when the order is identified to the picker at the order identification time.

In some embodiments, the online concierge system 140 determines the order identification time corresponding to a time interval by incrementing the time when the characteristics of the order were received 305 by a specific amount. In response to the order identification time being within a threshold amount of time before the closing time of the retailer, the online concierge system 140 increments the order identification time by the predicted amount of time to complete obtaining items from the retailer to generate an acquisition time and determines 325 whether the acquisition is later than the closing time of the retailer. However, in response to the order identification time being greater than the threshold amount of time before the closing time of the retailer, the online concierge system 140 does not generate the acquisition time for the order identification time. This allows the online concierge system 140 to limit generation and evaluation of an acquisition time relative to the closing time of the retailer to order identification times within the threshold amount of time from the closing time of the retailer.

In response to determining 325 the acquisition time is later than the closing time of the retailer, the online concierge system 140 disables 330 an option in the ordering interface for the user to select the time interval corresponding to the order identification time from which the acquisition time was generated, as the picker would be unable to obtain the items for the order before the closing time of the retailer. By disabling 330 the option for selecting the time interval from the ordering interface, the online concierge system 140 prevents the user from selecting the time interval corresponding to the order identification time when the picker is unlikely to obtain the items for the order before the retailer closes.

However, in response to determining 325 the acquisition time is earlier than the closing time of the retailer, the online concierge system 140 enables 335 the option in the ordering interface for the user to select time interval corresponding to the order identification time from which the acquisition time was generated, as the picker would be able to obtain the items for the order before the retailer closes. As the travel time model determines 315 the predicted travel time based on characteristics of the order, the online concierge system 140 provides for a wider range of potential times for the order to be selected by a picker, and allows the online concierge system 140 to perform order-specific evaluations of whether a picker is capable of obtaining items in an order before a retailer included in the order closes.

In various embodiments, when the online concierge system 140 determines 325 whether the acquisition time is before the closing time of the retailer, the online concierge system 140 generates a probability of fulfilling the order during a day when the online concierge system 140 received the order. The generated probability may be a probability of the order being able to be fulfilled during the day the online concierge system 140 received the order or may be a probability of the order being unable to be fulfilled during the day the online concierge system 140 received the order in various embodiments. The online concierge system 140 applies a same day fulfillment model to characteristics of the order to determine the probability of fulfilling the order during the day when the online concierge system 140 received the order. Example characteristics of the order to which the same day fulfillment model is applied include: a number of items in the order, items in the order, item categories of items in the order, the location included in the order, and the retailer included in the order. In some embodiments, the same day fulfillment model also receives an order identification time of the order as an input. However, different or additional characteristics of the order may be received by the same day fulfillment model as input in various embodiments.

In various embodiments, the online concierge system 140 trains the same day fulfillment model to receive characteristics of the order and to generate the probability of fulfilling the order during the day the online concierge system 140 received the order (e.g., a predicted probability of the order being fulfilled during the day when the order was received or a predicted probability of the order being unable to be fulfilled during the day when the order was received). The online concierge system 140 generates a same day fulfillment training dataset from previously fulfilled orders. The same day fulfillment training dataset includes multiple same day fulfillment training examples. Each same day fulfillment training example includes characteristics of a previously received order, with a label applied to a same day fulfillment training example indicating whether the previously received order was fulfilled during a day when the online concierge system 140 received the previously received order.

The same day fulfillment model comprises a set of weights stored on a non-transitory computer readable storage medium in various embodiments. For training, the online concierge system 140 initializes a network of a plurality of layers comprising the same day fulfillment model, with each layer including one or more weights. The same day fulfillment model receives as input a set of characteristics of an order and outputs a probability of fulfilling the order during the day the online concierge system 140 received the order.

After initializing the set of weights comprising the same day fulfillment model, the online concierge system 140 trains the same day fulfillment model by applying the same day fulfillment model to multiple same day fulfillment training examples of the same day fulfillment training dataset to generate the parameters (e.g., the weights) for the same day fulfillment model. As further described above, in various embodiments, a same day fulfillment training example includes a combination of characteristics of a previously received order, with a label applied to the same day fulfillment training example indicating whether the previously received order in the same day fulfillment training example was fulfilled on a day when the online concierge system received the previously received order. Applying the same day fulfillment model to a same day fulfillment training example generates a probability of fulfilling the previously received order in the same day fulfillment training example during the day the online concierge system 140 received the previously received order.

For each same day fulfillment training example to which the same day fulfillment model is applied, the online concierge system 140 generates a score comprising an error term based on the probability of fulfilling the previously received order in the same day fulfillment training example during the day the online concierge system 140 received the previously received order and the label applied to the same day fulfillment training example. The error term is larger when a difference between the probability of fulfilling the previously received order in the same day fulfillment training example during the day the online concierge system 140 received the previously received order and the label applied to the same day fulfillment training example is larger and is smaller when the difference between the probability of fulfilling the previously received order in the same day fulfillment training example during the day the online concierge system 140 received the previously received order and the label applied to the same day fulfillment training example is smaller. In various embodiments, the online concierge system 140 generates the error term using a loss function based on a difference between the probability of fulfilling the previously received order in the same day fulfillment training example during the day the online concierge system 140 received the previously received order and the label applied to the same day fulfillment training example. Example loss functions include a mean square error function, a mean absolute error, a hinge loss function, and a cross-entropy loss function.

The online concierge system 140 backpropagates the error term to update the set of parameters comprising the same day fulfillment model and stops backpropagation in response to the error term, or in response to the loss function, satisfying one or more criteria. For example, the online concierge system 140 backpropagates the error term through the same day fulfillment model to update parameters of the same day fulfillment model until the error term has less than a threshold value. For example, the online system 140 may apply gradient descent to update the set of parameters comprising the same day fulfillment model. The online concierge system 140 stores the set of parameters comprising the trained same day fulfillment model on a non-transitory computer readable storage medium after stopping the backpropagation.

The online concierge system 140 compares a probability of fulfilling the order during the day the online concierge system 140 received the order to a threshold probability. In response to the comparison satisfying one or more criteria, the online concierge system 140 disables 330 the option in the ordering interface for the user to select the time interval corresponding to the order identification time. In embodiments where the same day fulfillment model generates a predicted probability of the order being able to be fulfilled during a day when the online concierge system 140 received the order, the comparison to the threshold probability determines whether the predicted probability of the order being able to be fulfilled during a day when the online concierge system 140 received the is less than the threshold probability. In response to the predicted probability of the order being able to be fulfilled during the day when the online concierge system 140 received the order, the online concierge system 140 disables 325 the option in the ordering interface for the user to select the time interval corresponding to the order identification time.

In embodiments where the same day fulfillment model generates a predicted probability of the order being unable to be fulfilled during the day when the online concierge system 140 received the order, the comparison determines whether the predicted probability of the order being unable to be fulfilled during the day when the online concierge system 140 received the order is greater than the threshold probability. In response to the predicted probability of the order being unable to be fulfilled during the day when the online concierge system 140 received the order being greater than the threshold probability, the online concierge system 140 disables 325 the option in the ordering interface for the user to select the priority time interval. As the same day fulfillment model generates a probability indicating ability of the order to be fulfilled the same day when the online concierge system 140 received the order based on the received characteristics of the order, the same day fulfillment model allows the online concierge system 140 to perform an additional evaluation of a probability of being able to fulfill the order the day the order is received by the online concierge system 140 for one or more time intervals. This provides the online concierge system 140 with increased accuracy when determining whether to disable 325 an option for selecting a time interval, which decreases a likelihood of the user selecting a time interval when the picker is unlikely to obtain items for fulfilling the order on the day the order was received before the closing time of the retailer. As the travel time model and the same day fulfillment model are based on the received characteristics of the order, they allow the online concierge system 140 to make order-specific determinations of time intervals for order fulfillment capable of being selected by the user compared to rule-based comparisons of predicted times when orders are fulfilled to the closing time of the retailer.

In one or more alternative embodiments, the online concierge system 140 conditions determining 320 the predicted amount of time to complete obtaining items from the retailer on whether a probability of fulfilling the order during the day when the online concierge system 140 received the order satisfies one or more criteria. In such alternative embodiments, the online concierge system 140 initially applies the same day fulfillment model to the characteristics of the order to determine the probability of fulfilling the order during the day when the online concierge system 140 received the order. In response to the probability of fulfilling the order during the day when the online concierge system 140 received the order not satisfying the one or more criteria, the online concierge system 140 generates 310 the predicted fulfillment time for the order, as further described above, and determines whether a combination of an order identification time for a time interval and the predicted fulfillment time is later than the closing time of the retailer. In response to the combination of the order identification time and the predicted fulfillment time being later than the closing time of the retailer, the online concierge system 140 disables 330 the option for selecting the time interval corresponding to the order identification time in an ordering interface. However, in response to the combination of the order identification time and the predicted fulfillment time being earlier than the closing time of the retailer, the online concierge system 140 enables 335 the option for selecting the time interval corresponding to the order identification time in the ordering interface.

In response to the probability of fulfilling the order during the day when the online concierge system 140 received the order satisfying the one or more criteria, the online concierge system 140 generates 310 the predicted fulfilment time and generates 320 the predicted travel time based on the characteristics of the order, as further described above. In embodiments where the same day fulfillment model generates a probability of the order being able to be fulfilled on a day the order was received by the online concierge system 140, the online concierge system 140 generates 310 the predicted fulfillment time and generates 320 the predicted travel time in response to the probability of the order being able to be fulfilled on the day the order was received by the online concierge system 140 being less than a threshold value. Similarly, in embodiments where the same day fulfillment model generates a probability of the order being unable to be fulfilled on a day the order was received by the online concierge system 140, the online concierge system 140 generates 310 the predicted fulfillment time and generates 320 the predicted travel time in response to the probability of the order being unable to be fulfilled on the day the order was received by the online concierge system 140 being less than the threshold value.

Subsequently, the online concierge system 140 determines 320 the predicted amount of time to complete obtaining items from the retailer and generates an acquisition time for an order identification time corresponding to the time interval by adding the predicted amount of time to complete obtaining items from the retailer to the order identification time. The online concierge system 140 determines 325 whether the acquisition time is later than the closing time of the retailer, as further described above. In response to the acquisition time being later than the closing time of the retailer, the online concierge system 140 disables 330 the option in the ordering interface for selecting the time interval. However, in response to the acquisition time being earlier than the closing time of the retailer, the online concierge system 140 enables 335 the option in the ordering interface for selecting the time interval.

Hence, the online concierge system 140 may use the predicted fulfillment time 310 for the order to determine whether the customer is able to select a time interval when the probability of fulfilling the order during the day when the order does not satisfy the one or more criteria, but uses the acquisition time for the order to determine whether the customer is able to select the time interval when the probability of fulfilling the order during the day when the order satisfies the one or more criteria. In such embodiments, the online concierge system 140 decreases the predicted fulfillment time by the predicted travel time when the probability of fulfilling the order during the day when the order satisfies the one or more criteria to provide the customer with a greater number of potential time intervals for fulfilling the order. As the acquisition time for a time interval does not include the time for the picker to travel from the retailer to the location in the order, the reduced amount of time for fulfilling the order may offset a time interval's higher probability of being unable to fulfill the order the day the online concierge system 140 received the order and enable the customer to select the time interval for fulfilling the order.

Figure 4:
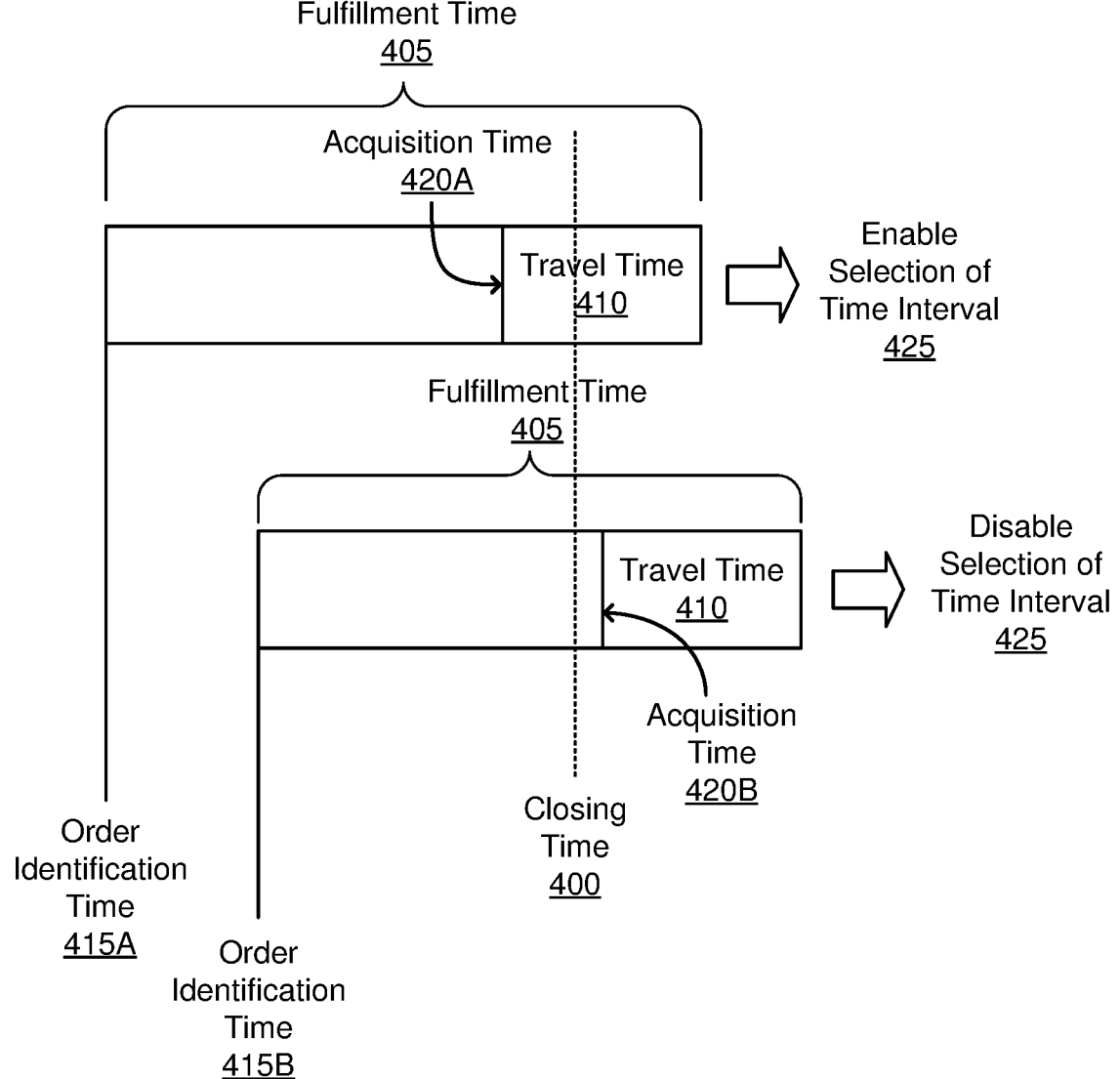
FIG. 4 illustrates a timing diagram depicting relationships between a closing time of a retailer and acquisition times of items for an order from the retailer corresponding to different order identification times to a picker, in accordance with one or more embodiments.

FIG. 4 is a timing diagram showing relationships between a closing time of a retailer and acquisition times of items for an order from the retailer corresponding to different order identification times to a picker. As further described above in conjunction with FIG. 3, an online concierge system 140 receives characteristics of an order from a user. The received characteristics include a retailer, one or more items to obtain from the retailer, and a location for delivering the one or more items. The online concierge system 140 retrieves a closing time 400 for the retailer, with the closing time 400 specifying a time of day after which a picker is unable to obtain items from the retailer.

While the received characteristics of the order include information identifying items identifying the retailer, items to obtain from the retailer, and a location where the items are to be delivered, to create the order, the online concierge system 140 subsequently prompts the user to select a time interval for fulfillment of the order. A time interval specifies a range of times when the user expects a picker fulfilling the order to provide the items from the order to the location specified by the order. In various embodiments, the online concierge system 140 identifies different time intervals to the user via an ordering interface, and the user selects a time interval for the order to create the order. One or more of the time intervals may be measured relative to a time when the order is received by the online concierge system 140, such as a priority time interval for fulfilling the order relative to a time when the online concierge system 140 receives the order. As a picker fulfilling the order is unable to obtain items from the retailer after the closing time 400 of the retailer, the online concierge system 140 disables options for selecting time intervals where the picker is unable to obtain the items in the order before the closing time 400 of the retailer.

As further described above in conjunction with FIG. 3, to prevent the user from selecting a time interval where the picker is unable to obtain items from the order before the closing time 400 of the retailer, the online concierge system 140 generates a predicted fulfillment time 405 based on the received characteristics of the order. The predicted fulfillment time 405 is an amount of time between the picker selecting the order and the user receiving the items in the order from the picker. As further described above in conjunction with FIG. 3, the online concierge system 140 generates the predicted fulfillment time 405 by applying a trained fulfillment time model to the received characteristics of the order. The predicted fulfillment time 405 of the order accounts for an amount of time for the picker to accept the order, an amount of time for the picker to travel to the retailer identified by the order, an amount of time for the picker to obtain items in the order from the retailer, and a travel time for the picker to deliver the obtained items to the location included in the order. As a picker may obtain items in the order before the closing time 400 of the retailer, but not arrive at the location identified by the order until after the closing time 400 of the retailer, the predicted fulfillment time 405 of the order may indicate fulfillment of the order after the closing time 400 of the retailer, despite a picker obtaining the items before the closing time 400 of the retailer.

To more accurately determine whether a picker is capable of obtaining the items from the order before the closing time 400 of the retailer, the online concierge system 140 generates a predicted travel time 410 for the picker to deliver the obtained items from the retailer to the location included in the order. Hence, the predicted fulfillment time 405 is a combination of the predicted travel time 410 and amounts of time for the picker to perform other actions for fulfilling the order (e.g., selecting the order, travelling to the retailer, obtaining items from the retailer). As further described above in conjunction with FIG. 3, the online concierge system 140 applies a trained travel time model to the characteristics of the order to generate the predicted travel time 410 for the picker to deliver obtained items from the retailer to the location included in the order.

Based on the predicted fulfillment time 405 and the predicted travel time 410, the online concierge system 140 determines a predicted amount of time to complete obtaining items from the retailer. In various embodiments, the online concierge system 140 determines the predicted amount of time to complete obtaining items from the retailer by subtracting the predicted travel time 410 from the predicted fulfillment time 405. The online concierge system 140 may modify the predicted travel time 410 by adding a buffer time interval to the predicted travel time 410 and subtracting the modified predicted travel time 410 from the predicted fulfillment time 405. Hence, the predicted amount of time to complete obtaining items from the retailer comprises an amount of time the picker spends fulfilling the order before leaving the retailer to deliver items from the order to the user. As the predicted amount of time to complete obtaining items from the retailer excludes the travel time 410 of the picker, the online concierge system 140 uses the predicted amount of time to complete obtaining items from the retailer to determine whether a picker is capable of obtaining the items for the order from the retailer before the closing time 400 of the retailer.

Using the predicted amount of time to complete obtaining items from the retailer, the online concierge system 140 evaluates different time intervals for fulfilling the order. In various embodiments, the online concierge system 140 identifies an order identification time for a time interval. The order identification time is a time when the received order is identified to one or more pickers. The online concierge system adds the predicted amount of time to complete obtaining items from the retailer to the order identification time to determine an acquisition time for a time interval corresponding to the order identification time. In the example of FIG. 4, the online concierge system 140 identifies order identification time 415A and generates acquisition time 420A by adding the predicted amount of time to complete obtaining items from the retailer to order identification time 415A. Similarly, in the example of FIG. 4, the online concierge system 140 also identifies order identification time 415B and generates acquisition time 420B by adding the predicted amount of time to complete obtaining items from the retailer to order identification time 415B.

The online concierge system 140 determines whether an acquisition time is later than the closing time 400 of the retailer to determine whether to enable an option in an ordering interface for selecting a time interval corresponding to an order identification time from which the acquisition time was generated. In the example of FIG. 4, the online concierge system 140 determines acquisition time 420A is earlier than the closing time 400 of the retailer. Hence, for order identification time 415A, the online concierge system 140 enables 425 selection of a corresponding time interval by the user. As shown in FIG. 4, acquisition time 420A is earlier than the closing time 400 of the retailer, so a picker fulfilling the order is likely to complete obtaining items for the order before the closing time 400 of the order. Even though the predicted fulfillment time 405 indicates the user would receive the items in the order after the closing time 400 of the retailer for order identification time 415A, because the picker is able to obtain the items from the retailer before the closing time 400, the online concierge system 140 enables 425 the user to select the time interval corresponding to order identification time 415A.

However, in the example of FIG. 4, the online concierge system 140 determines acquisition time 420B is later than the closing time 400 of the retailer. Hence, the online concierge system 140 disables 430 selection of a time interval corresponding to order identification time 415B. As shown in FIG. 4, acquisition time 420B is later than the closing time 400 of the retailer, so a picker fulfilling the order is unlikely to complete obtaining items for the order before the closing time 400 of the retailer. Because the picker is unlikely to obtain the items for the order before the closing time 400 of the retailer, the online concierge system 140 disables 430 selection of the time interval corresponding to order identification time 415B by the user. This prevents the user from selecting a time interval in which the order is unlikely to be fulfilled during a same day as the order is received.

Figure 5:
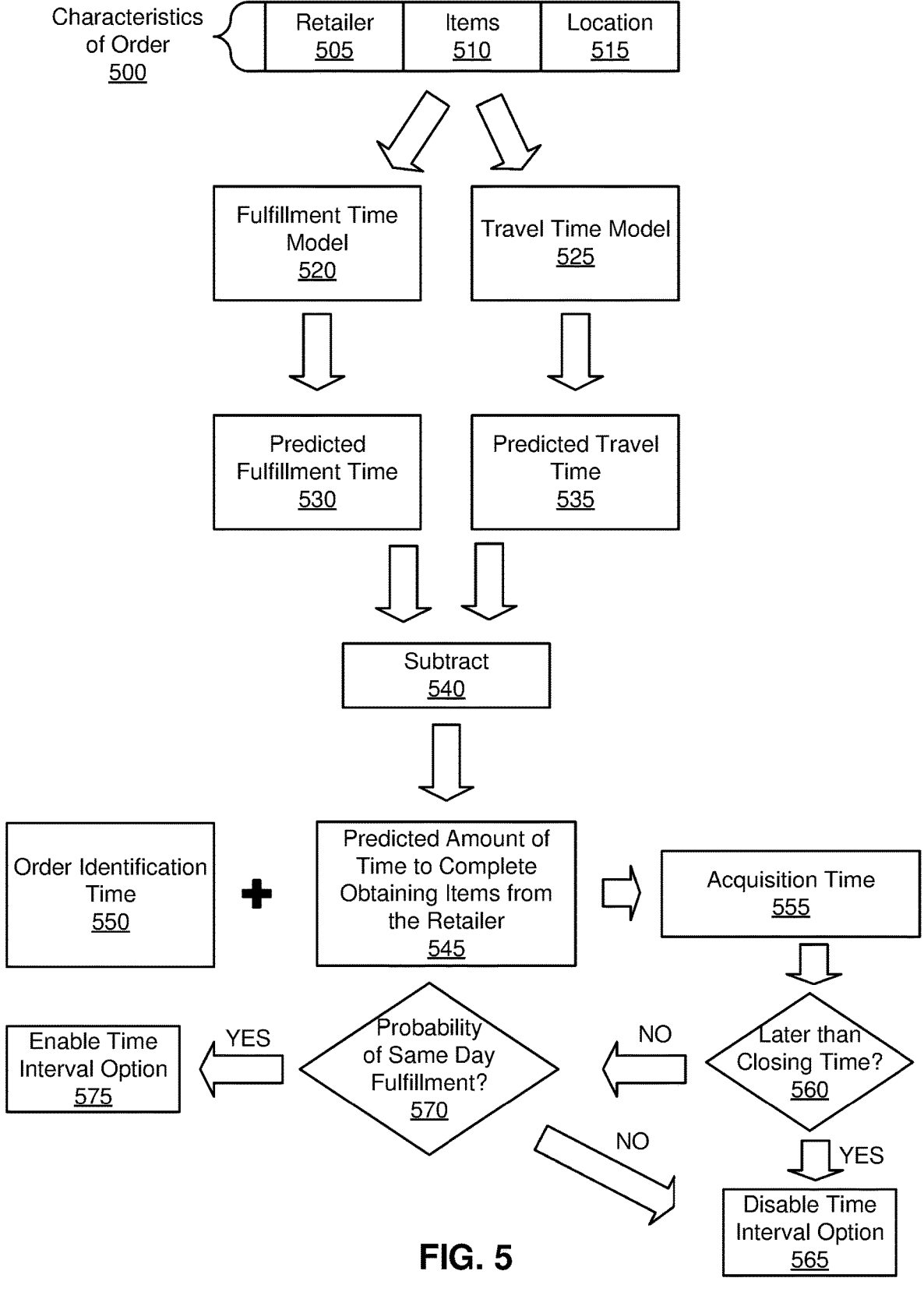
FIG. 5 illustrates a process flow diagram of a method for determining whether an order received by an online concierge system is capable of being fulfilled on a day when the order is received a predicted travel time from a retailer for a picker fulfilling the order, in accordance with one or more embodiments.

FIG. 5 is a process flow diagram of a method for determining whether an order received by an online concierge system 140 is capable of being fulfilled on a day when the order is received using a trained model predicting travel time from a retailer for a picker fulfilling the order. The online concierge system 140 receives characteristics 500 of an order from a user. The characteristics 500 of the order received by the online concierge system 140 include a retailer 505, one or more items 510 to be obtained from the retailer 505, and a location 515 where the items 510 are to be delivered. In various embodiments, the user provides the characteristics 500 of the order to an ordering interface generated by an application associated with the online concierge system 140 executing on a user client device 100 of the user. The user client device 110 transmits the received characteristics 500 of the order to the online concierge system 140.

While the characteristics 500 of the order provide information about the order, to complete creation of the order, the online concierge system 140 identifies one or more time intervals for fulfilling the order to the user. The user selects a time interval to identify a range of times when the user expects to receive the items 510 included in the order. In some embodiments, the online concierge system 140 identifies multiple discrete time intervals, each corresponding to different ranges of times, to the user via an ordering interface. One or more time intervals are measured relative to the time when the online concierge system receives the order in some embodiments. For example, a time interval is a priority time interval for fulfilling the order within an amount of time after a time when the order is received.

However, the retailer 505 included in the characteristics 500 of the order has hours of operation, outside of which pickers are unable to obtain items from the retailer 505. The hours of operation for the retailer 505 comprise an opening time and a closing time, with the opening time specifying an earliest time pickers are capable of obtaining items from the retailer 505 and the closing time specifying a latest time pickers are capable of obtaining items from the retailer. The online concierge system 140 retrieves hours of operation for the retailer 505 from data associated with the retailer 505 in the data store 240.

In various embodiments, when the characteristics 500 of the order are received within a threshold amount of time from the closing time of the retailer, there may be insufficient time for a picker fulfilling the order to obtain items 510 from the retailer 505 before the closing time of the retailer during certain time intervals for fulfilling the order. This inability to obtain items 510 before the closing time of the retailer 505 prevents the picker from fulfilling the order, which may deter the user from creating additional orders through the online concierge system 140. In various embodiments the online concierge system 140 prevents the user from selecting one or more time intervals for fulfilling the order when a picker is unlikely to obtain the items 510 before the closing time of the retailer 505 to decrease a likelihood of the user selecting a time interval for fulfillment when the picker is unlikely to obtain the items 510 before the closing time of the retailer 505.

To prevent the user from selecting a time interval for fulfilling the order when the picker would be unlikely to obtain the items 510 from the order before the closing time of the retailer 505, the online concierge system 140 applies a fulfillment time model 520 to the characteristics 500 of the order. As further described above in conjunction with FIG. 3, the fulfillment time model 520 is trained based on prior orders to generate a predicted fulfillment time 530 for the order from the characteristics 500 of the order. The predicted fulfillment time 530 indicates an amount of time for a picker to fulfil the order from a time the picker selects the order for fulfillment to a time the picker delivers items 510 from the retailer 505 to the location 515 in the characteristics 500 of the order.

While the online concierge system 140 may use the predicted fulfillment time 530 and an order identification time when the order is identified to pickers to determine whether a picker is capable of fulfilling the order before the closing time of the retailer 505, the predicted fulfillment time 530 includes time when the picker is delivering items 510 obtained from the retailer 505 to the location 515. After a picker has obtained the items from the retailer 505, the closing time of the retailer 505 does not prevent the picker from fulfilling the order. So, using the predicted fulfillment time to determine whether a picker is capable of fulfilling the order during one or more time intervals may cause the online concierge system 140 to identify certain time intervals as time intervals where a picker is unable to fulfill the order, even when a picker may obtain items 510 from the retailer 505 before its closing time but deliver the obtained items 510 to the location 515 after the closing time of the retailer 505. Although using the predicted fulfillment time to identify time intervals to prevent from being selected by the user decreases a likelihood of the user selecting a time interval when the picker may be unable to obtain items 510 before the closing time of the retailer, preventing the user from selecting certain time intervals because of the predicted fulfillment time may overly limit potential time intervals for fulfilling the order available to the user.

To compensate for effects of time after the picker has left the retailer 505 to deliver the items 510 on the predicted fulfillment time 530, the online concierge system 140 applies a travel time model 525 to the characteristics 500 of the order. As further described above in conjunction with FIG. 3, the travel time model 525 is trained based on prior orders fulfilled for users. Based on the characteristics 500 of the order, the travel time model 525 generates a predicted travel time 535 of a picker when fulfilling the order. The predicted travel time 535 indicates an amount of time for a picker to travel from the retailer 505 to the location 515 identified by the characteristics 500 of the order.

The online concierge system 140 subtracts 540 the predicted travel time 535 from the predicted fulfillment time 530 to determine a predicted amount of time 545 to complete obtaining items 510 from the retailer 505. In some embodiments, the online concierge system 140 generates a modified predicted travel time 535 by adding a buffer time interval to the predicted travel time 535 and determines the predicted amount of time 545 to complete obtaining items from the retailer by subtracting 540 the modified predicted travel time from the predicted fulfillment time 530. Increasing the predicted travel time 535 by the buffer time interval allows the online concierge system 140 to account for potential errors in the predicted travel time 535 or for potential variations in the closing time of the retailer 505. Hence, a predicted amount of time 545 to complete obtaining items 510 from the retailer 505 is an amount of time spent by a picker fulfilling the order before the picker leaves the retailer 505 to travel to the location 515 identified by the order.

For an order identification time 550, which is a time when the order is identified to one or more pickers for selection, the online concierge system 140 generates an acquisition time 550 by adding the predicted amount of time 545 to complete obtaining items 510 from the retailer 505 to the order identification time 550. The order identification time 550 is correlated with a time interval for fulfilling the order. In various embodiments, the order identification time 550 is within a threshold time interval of the closing time of the retailer 505, allowing the online concierge system to limit determination of the acquisition time 550 to certain order identification times 550. As the predicted amount of time 545 to complete obtaining items 510 from the retailer 505 excludes the travel time form the retailer 505 to the location 515, the acquisition time 555 is a time when the retailer has completed obtaining items 510 from the retailer 505.

The online concierge system 140 determines 560 whether the acquisition time 555 is later than the closing time of the retailer 505. In response to determining 560 the acquisition time 555 is later than the closing time of the retailer, the online concierge system 140 disables an option in an ordering interface for the user to select a time interval corresponding to the order identification time 555, as the picker would be unable to obtain the items 510 for the order before the closing time of the retailer 505. Disabling 565 the option for selecting the time interval corresponding to the order identification time 550 prevents the user from selecting a time interval when the picker is unlikely to obtain the items 510 for the order prior to the closing time of the retailer 505.

In some embodiments, in response to determining 560 the acquisition time 555 is earlier than the closing time of the retailer 505, the online concierge system 140 enables 575 the option in the ordering interface for the user to select the time interval corresponding to the order identification time 550, as the picker would be able to obtain the items 510 for the order before the closing time of the retailer 505. However, in the example shown by FIG. 5, in response to determining 560 the acquisition time 555 is earlier than the closing time of the retailer 505, the online concierge system 140 determines 570 whether a probability of fulfillment of the order the day the online concierge system 140 received the order satisfies one or more criteria. As further described above in conjunction with FIG. 3, in various embodiments, the online concierge system 140 applies a same day fulfillment model to characteristics 500 of the order to determine the probability of fulfilling the order during the day the online concierge system 140 received the order. In some embodiments, the same day fulfillment model generates a probability of the order being able to be fulfilled during the day when the order is received. Alternatively, the same day fulfillment model generates a probability of the order being unable to be fulfilled during the day when the order is received. The online concierge system 140 trains the same day fulfillment model based on stored information for previously received orders indicating whether a previously received order was fulfilled on a day when the online concierge system 140 received the previously received order.

In embodiments where the same day fulfillment model generates a probability of the order being able to be fulfilled on a day the online concierge system 140 received the order, the online concierge system 140 determines 570 whether the probability of the order being able to be fulfilled on the day the online concierge system 140 received the order is greater than a threshold probability. In response to determining 570 the probability of the order being able to be fulfilled on the day the online concierge system 140 received the order is greater than a threshold probability, the online concierge system 140 enables 575 the option in the ordering interface for the user to select the time interval corresponding to the order identification time 550. However, in response to determining 570 the probability of the order being able to be fulfilled on the day online concierge system 140 received the order, the online concierge system 140 disables 565 the option in the ordering interface for selecting the time interval corresponding to the order identification time 550.

Alternatively, where the same day fulfillment model generates a probability of the order being unable to be fulfilled on a day the online concierge system 140 received the order, the online concierge system 140 determines 570 whether the probability the order being unable to be fulfilled on the day the online concierge system 140 received the order is less than an additional threshold probability. In response to determining 570 the probability of the order being unable to be fulfilled on the day the online concierge system 140 received the order is less than the additional threshold probability, the online concierge system 140 enables 575 the option in the ordering interface for the user to select the time interval corresponding to the order identification time 550. However, in response to determining 570 the probability of the order being unable to be fulfilled on the day the online concierge system 140 received the order is greater than the additional threshold probability, the online concierge system 140 disables 565 the option in the ordering interface for selecting the time interval corresponding to the order identification time 550.

While FIG. 5 shows an embodiment where the online concierge system 140 determines 570 whether the probability of fulfilling the order on the day the online concierge system 140 was received after determining 560 whether an acquisition time of the order, which excludes time for a picker to travel from the retailer 505 to the location 515 in the order 500, in alternative embodiments, the online concierge system 140 conditions determining the predicted amount of time 545 to complete obtaining items from the retailer on the probability of fulfilling the order the day the online concierge system 140 received the order. In such alternative embodiments, the online concierge system 140 initially applies the same day fulfillment model to the characteristics 500 of the order to determine the probability of fulfilling the order during the day when the online concierge system 140 received the order. In response to the probability of fulfilling the order during the day when the online concierge system 140 received the order not satisfying the one or more criteria, the online concierge system 140 generates the predicted fulfillment time 530 for the order, as further described above, and determines whether a combination of an order identification time 550 for a time interval and the predicted fulfillment time 530 is later than the closing time of the retailer. In response to the combination of the order identification time 550 and the predicted fulfillment time 530 being later than the closing time of the retailer 505, the online concierge system 140 disables 565 the option for selecting the time interval corresponding to the order identification time in the ordering interface. However, in response to the combination of the order identification time 550 and the predicted fulfillment time 530 being earlier than the closing time of the retailer, the online concierge system 140 enables 575 the option for selecting the time interval corresponding to the order identification time in the ordering interface.

In response to the probability of fulfilling the order during the day when the online concierge system 140 received the order satisfying the one or more criteria, the online concierge system 140 generates the predicted fulfilment time 530 and the predicted travel time 535 based on the characteristics 500 of the order, as further described above. In embodiments where the same day fulfillment model generates a probability of the order being able to be fulfilled on a day the order was received by the online concierge system 140, the online concierge system 140 generates the predicted travel time 535 and generates the predicted fulfillment time 530 in response to the probability of the order being able to be fulfilled on the day the order was received by the online concierge system 140 being less than a threshold value. Similarly, in embodiments where the same day fulfillment model generates a probability of the order being unable to be fulfilled on a day the order was received by the online concierge system 140, the online concierge system 140 generates predicted fulfillment time 530 and the predicted travel time 535 in response to the probability of the order being unable to be fulfilled on the day the order was received by the online concierge system 140 being less than the threshold value.

Subsequently, the online concierge system 140 determines the predicted amount of time 545 to complete obtaining items from the retailer 505 and generates an acquisition time 555 for an order identification time 540 corresponding to the time interval by adding the predicted amount of time 545 to complete obtaining items from the retailer to the order identification time 550. The online concierge system 140 determines 560 whether the acquisition time 555 is later than the closing time of the retailer 505, as further described above. In response to the acquisition time 555 being later than the closing time of the retailer 505, the online concierge system 140 disables 560 the option in the ordering interface for selecting the time interval. However, in response to the acquisition time 555 being earlier than the closing time of the retailer 505, the online concierge system 140 enables 575 the option in the ordering interface for selecting the time interval.

Hence, the online concierge system 140 may use the predicted fulfillment time 530 for the order to determine whether the customer is able to select a time interval when the probability of fulfilling the order during the day when the online concierge system 140 received the order does not satisfy the one or more criteria, but uses the acquisition time 555 for the order to determine whether the customer is able to select the time interval when the probability of fulfilling the order during the day when the order satisfies the one or more criteria. In such embodiments, the online concierge system 140 decreasing the predicted fulfillment time 530 by the predicted travel time 535 when the probability of fulfilling the order during the day when the online concierge system 140 received the order removes the predicted travel time 535 when evaluating a time interval. This reduced time based on when the picker leaves the retailer 505, rather than arrives at the location 515, may offset a higher probability of being unable to fulfill the order the day the online concierge system 140 received the order for a time interval and enable the customer to select the time interval for order fulfillment.

In the example of FIG. 5, the probability indicating ability of the order to be fulfilled the day when the online concierge system 140 received the order and the predicted travel time 535 are determined from the characteristics 500 of the order, providing the online concierge system 140 with order-specific information for evaluating a likelihood of a picker obtaining items for the order from the retailer 505 before the closing time of the retailer during different time intervals. Such order-specific evaluations of time intervals for fulfilling different orders provides a wider range of potential time intervals for order fulfillment to a user, while mitigating a likelihood of a user selecting a time interval during which a picker is unlikely to obtain items for an order before the closing time of a retailer for fulfillment, compared to rule-based comparisons of predicted times when orders are fulfilled to the closing time of the retailer 505. Similarly, using the predicted amount of time 545 to complete obtaining items from the retailer 505 rather than the predicted fulfillment time 530 to determine whether to enable selection of a time interval by the user more accurately accounts for potential effects of the closing time of the retailer 505 on a picker's ability to fulfill the order, providing a wider range of potential time intervals for fulfilling the order.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer readable medium, comprising:

receiving characteristics of an order for fulfillment at the computer system, the characteristics including one or more items and a retailer from which the one or more items are to be acquired, the retailer having a closing time;

generating a predicted fulfillment time of the order comprising an amount of time from a picker selecting the order to fulfill for a user receiving the items included in the order from the picker by applying a fulfillment time model to the characteristics of the order;

generating a predicted travel time for the picker to deliver obtained items in the order to a location included in the order by applying a travel time model to the characteristics of the order, the travel time model trained by:

obtaining a travel time training dataset including a plurality of travel time training examples, each travel time training example including characteristics of a prior order, each training example having a label specifying an amount of time from obtaining the items in the prior order to the items in the prior order being received at a location identified in the prior order;

applying the travel time model to each travel time training example of the travel time training dataset to generate a predicted travel time from a retailer included in the travel time training example to a location included in the travel time training example;

scoring the travel time model using a loss function and the label of the travel time training example; and updating one or more parameters of the travel time model by backpropagation based on the scoring until one or more criteria are satisfied;

generating a predicted amount of time to complete obtaining items from the retailer by subtracting the predicted travel time for the picker to deliver obtained items in the order to the location included in the order from the predicted fulfillment time; and in response to generating an acquisition time comprising a sum of an order identification time of the order to the picker and the predicted amount of time to complete obtaining items from the retailer is before the closing time of the retailer, enabling an option in an ordering interface for the user to select a time interval corresponding to the order identification time for fulfillment of the order.

2. The method of claim 1, further comprising:

in response to determining the acquisition time is later than the closing time of the retailer, disabling the option in the ordering interface for the user to select the time interval corresponding to the order identification time for fulfillment of the order.

3. The method of claim 1, wherein determining the predicted amount of time to complete obtaining items from the retailer by subtracting the predicted travel time from the predicted fulfillment time comprises:

generating a modified predicted travel time for the picker to deliver obtained items in the order to the location included in the order by adding a buffer time interval to the predicted travel time for the picker to deliver obtained items in the order to the location included in the order; and subtracting the modified predicted travel time for the picker to deliver obtained items in the order to the location included in the order from the predicted fulfillment time.

4. The method of claim 1, wherein enabling the option in the ordering interface for the user to select the time interval corresponding to the order identification time for fulfillment of the order comprises:

generating a probability of the order being unable to be fulfilled on a day the order was received by the computer system by applying a same day fulfillment model to the received characteristics of the order; and enabling the option in the ordering interface for the user to select the time interval corresponding to the order identification time for fulfillment of the order in response to the probability of the order being unable to be fulfilled on the day the order was received by the computer system being less than a threshold probability.

5. The method of claim 4, wherein enabling the option in the ordering interface for the user to select the time interval corresponding to the order identification time for fulfillment of the order further comprises:

disabling the option in the ordering interface for the user to select the time interval corresponding to the order identification time for fulfillment of the order in response to the probability of the order being unable to be fulfilled on the day the order was received by the computer system exceeding the threshold probability.

6. The method of claim 1, wherein enabling the option in the ordering interface for the user to select the time interval corresponding to the order identification time for fulfillment of the order comprises:

generating a probability of the order being able to be fulfilled on a day the order was received by the computer system by applying a same day fulfillment model to the received characteristics of the order; and enabling the option in the ordering interface for the user to select the time interval corresponding to the order identification time for fulfillment of the order in response to the probability of the order being able to be fulfilled on the day the order was received by the computer system being greater than a threshold probability.

7. The method of claim 6, wherein enabling the option in the ordering interface for the user to select the time interval corresponding to the order identification time for fulfillment of the order further comprises:

disabling the option in the ordering interface for the user to select the time interval corresponding to the order identification time for fulfillment of the order in response to the probability of the order being able to be fulfilled on the day the order was received by the computer system being less than the threshold probability.

8. The method of claim 1, wherein the order identification time is within a threshold amount of time from the closing time of the retailer.

9. A computer program product comprising a non-transitory computer readable storage medium having instructions encoded thereon that, when executed by a processor, cause the processor to perform steps comprising:

receiving characteristics of an order for fulfillment at an online concierge system, the characteristics including one or more items and a retailer from which the one or more items are to be acquired, the retailer having a closing time;

generating a predicted fulfillment time of the order comprising an amount of time from a picker selecting the order to fulfill for a user receiving the items included in the order from the picker by applying a fulfillment time model to the characteristics of the order;

generating a predicted travel time for the picker to deliver obtained items in the order to a location included in the order by applying a travel time model to the characteristics of the order, the travel time model trained by:

obtaining a travel time training dataset including a plurality of travel time training examples, each travel time training example including characteristics of a prior order, each training example having a label specifying an amount of time from obtaining the items in the prior order to the items in the prior order being received at a location identified in the prior order;

applying the travel time model to each travel time training example of the travel time training dataset to generate a predicted travel time from a retailer included in the travel time training example to a location included in the travel time training example;

scoring the travel time model using a loss function and the label of the travel time training example; and updating one or more parameters of the travel time model by backpropagation based on the scoring until one or more criteria are satisfied;

generating a predicted amount of time to complete obtaining items from the retailer by subtracting the predicted travel time for the picker to deliver obtained items in the order to the location included in the order from the predicted fulfillment time; and in response to generating an acquisition time comprising a sum of an order identification time of the order to the picker and the predicted amount of time to complete obtaining items from the retailer is before the closing time of the retailer, enabling an option in an ordering interface for the user to select a time interval corresponding to the order identification time for fulfillment of the order.

10. The computer program product of claim 9, wherein the non-transitory computer readable storage medium further has instructions encoded thereon that, when executed by the processor, cause the processor to perform steps comprising:

in response to determining the acquisition time is later than the closing time of the retailer, disabling the option in the ordering interface for the user to select the time interval corresponding to the order identification time for fulfillment of the order.

11. The computer program product of claim 9, wherein determining the predicted amount of time to complete obtaining items from the retailer by subtracting the predicted travel time from the predicted fulfillment time comprises:

generating a modified predicted travel time for the picker to deliver obtained items in the order to the location included in the order by adding a buffer time interval to the predicted travel time for the picker to deliver obtained items in the order to the location included in the order; and subtracting the modified predicted travel time for the picker to deliver obtained items in the order to the location included in the order from the predicted fulfillment time.

12. The computer program product of claim 9, wherein enabling the option in the ordering interface for the user to select the time interval corresponding to the order identification time for fulfillment of the order comprises:

generating a probability of the order being unable to be fulfilled on a day the order was received by the online concierge system by applying a same day fulfillment model to the received characteristics of the order; and enabling the option in the ordering interface for the user to select the time interval corresponding to the order identification time for fulfillment of the order in response to the probability of the order being unable to be fulfilled on the day the order was received by the online concierge system being less than a threshold probability.

13. The computer program product of claim 12, wherein enabling the option in the ordering interface for the user to select the time interval corresponding to the order identification time for fulfillment of the order further comprises:

disabling the option in the ordering interface for the user to select the time interval corresponding to the order identification time for fulfillment of the order in response to the probability of the order being unable to be fulfilled on the day the order was received by the online concierge system exceeding the threshold probability.

14. The computer program product of claim 9, wherein enabling the option in the ordering interface for the user to select the time interval corresponding to the order identification time for fulfillment of the order comprises:

generating a probability of the order being able to be fulfilled on a day the order was received by the online concierge system by applying a same day fulfillment model to the received characteristics of the order; and enabling the option in the ordering interface for the user to select the time interval corresponding to the order identification time for fulfillment of the order in response to the probability of the order being able to be fulfilled on the day the order was received by the online concierge system being greater than a threshold probability.

15. The computer program product of claim 14, wherein enabling the option in the ordering interface for the user to select the time interval corresponding to the order identification time for fulfillment of the order further comprises:

disabling the option in the ordering interface for the user to select the time interval corresponding to the order identification time for fulfillment of the order in response to the probability of the order being able to be fulfilled on the day the order was received by the online concierge system being less than the threshold probability.

16. The computer program product of claim 9, wherein the order identification time is within a threshold amount of time from the closing time of the retailer.

17. A system comprising:

a processor;

a non-transitory computer readable storage medium having instructions encoded thereon that, when executed by the processor, cause the processor to perform steps comprising:

receiving characteristics of an order for fulfillment at an online concierge system, the characteristics including one or more items and a retailer from which the one or more items are to be acquired, the retailer having a closing time;

generating a predicted fulfillment time of the order comprising an amount of time from a picker selecting the order to fulfill for a user receiving the items included in the order from the picker by applying a fulfillment time model to the characteristics of the order;

generating a predicted travel time for the picker to deliver obtained items in the order to a location included in the order by applying a travel time model to the characteristics of the order, the travel time model trained by:

obtaining a travel time training dataset including a plurality of travel time training examples, each travel time training example including characteristics of a prior order, each training example having a label specifying an amount of time from obtaining the items in the prior order to the items in the prior order being received at a location identified in the prior order;

applying the travel time model to each travel time training example of the travel time training dataset to generate a predicted travel time from a retailer included in the travel time training example to a location included in the travel time training example;

scoring the travel time model using a loss function and the label of the travel time training example; and updating one or more parameters of the travel time model by backpropagation based on the scoring until one or more criteria are satisfied;

generating a predicted amount of time to complete obtaining items from the retailer by subtracting the predicted travel time for the picker to deliver obtained items in the order to the location included in the order from the predicted fulfillment time; and in response to generating an acquisition time comprising a sum of an order identification time of the order to the picker and the predicted amount of time to complete obtaining items from the retailer is before the closing time of the retailer, enabling an option in an ordering interface for the user to select a time interval corresponding to the order identification time for fulfillment of the order.

18. The system of claim 17, wherein the non-transitory computer readable storage medium further has instructions encoded thereon that, when executed by the processor, cause the processor to perform steps comprising:

in response to determining the acquisition time is later than the closing time of the retailer, disabling the option in the ordering interface for the user to select the time interval corresponding to the order identification time for fulfillment of the order.

19. The system of claim 17, wherein enabling the option in the ordering interface for the user to select the time interval corresponding to the order identification time for fulfillment of the order comprises:

generating a probability of the order being unable to be fulfilled on a day the order was received by the online concierge system by applying a same day fulfillment model to the received characteristics of the order; and enabling the option in the ordering interface for the user to select the time interval corresponding to the order identification time for fulfillment of the order in response to the probability of the order being unable to be fulfilled on the day the order was received by the online concierge system being less than a threshold probability.

20. The system of claim 17, wherein enabling the option in the ordering interface for the user to select the time interval corresponding to the order identification time for fulfillment of the order comprises:

generating a probability of the order being able to be fulfilled on a day the order was received by the online concierge system by applying a same day fulfillment model to the received characteristics of the order; and enabling the option in the ordering interface for the user to select the time interval corresponding to the order identification time for fulfillment of the order in response to the probability of the order being able to be fulfilled on the day the order was received by the online concierge system being greater than a threshold probability.

* * * * *